United States Patent [19]

Luiz et al.

[11] 4,207,609
[45] Jun. 10, 1980

[54] METHOD AND MEANS FOR PATH INDEPENDENT DEVICE RESERVATION AND RECONNECTION IN A MULTI-CPU AND SHARED DEVICE ACCESS SYSTEM

[75] Inventors: Fernando A. Luiz, Monte Sereno; Harlan C. Snyder, Saratoga; John H. Sorg, Jr., Los Gatos, all of Calif.

[73] Assignee: International Business Machines Corporation, Armonk, N.Y.

[21] Appl. No.: 904,050

[22] Filed: May 8, 1978

[51] Int. Cl.² ............................................. G06F 13/04
[52] U.S. Cl. .................................................... 364/200
[58] Field of Search ................ 364/200 MS File, 101, 364/117; 179/18 EA, 18 ES

[56] References Cited

U.S. PATENT DOCUMENTS

| 3,274,561 | 9/1966 | Hallman et al. | 364/200 |
| 3,386,082 | 5/1968 | Stafford et al. | 364/200 |
| 3,564,502 | 2/1971 | Boehner et al. | 364/200 |
| 3,581,286 | 5/1971 | Beausoleil | 364/200 |
| 3,593,302 | 7/1971 | Saito et al. | 364/200 |
| 3,639,909 | 2/1972 | Hauck et al. | 364/200 |
| 3,675,209 | 7/1972 | Trost et al. | 364/900 |
| 3,716,837 | 2/1973 | Waddell | 364/200 |
| 3,725,864 | 4/1973 | Clark et al. | 364/200 |
| 3,768,074 | 10/1973 | Sharp et al. | 364/200 |
| 4,004,277 | 1/1977 | Gavril | 364/200 |

Primary Examiner—Gareth D. Shaw
Assistant Examiner—Thomas M. Heckler
Attorney, Agent, or Firm—R. Bruce Brodie

[57] ABSTRACT

A method and means for path independent reservation and reconnection of devices to CPU's operating in a multi-CPU and shared device access system environment. The multi-CPU and shared device access system comprises a plurality of sets of fan out paths (channels), each set coupling a corresponding CPU as a source node; a plurality of input/output devices; and a plurality of control nodes (control units), each node including means for accessing the devices, for selectively intercepting the paths in order to complete a signal path connection to a single destination device. Each control node further includes means (FIG. 2, element 25') for storing a table of independent path sets of CPU's and reserved devices and means (FIGS. 2-5) for managing the connection of CPU's to devices such that for any given selection, reservation or reconnection indication, the table is accessed by at least one control node for ascertaining whether the CPU is a member of a set of interfaces to which the device is reserved, if so, an available path is selected. The control nodes thus allocate dynamically dissimilar path sets to devices and CPU's on an allegiance basis in order to increase the signal path connection probability by the devices to counterpart CPU's involved in the reservation, release, or reconnection of the device and the CPU.

7 Claims, 12 Drawing Figures

NETWORK RELATIONS

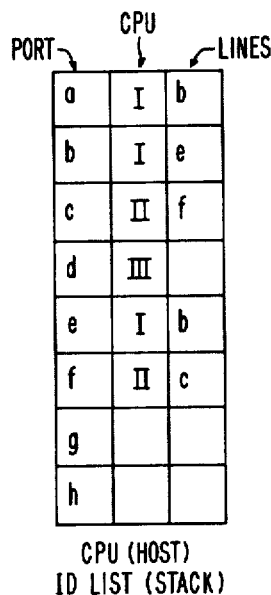
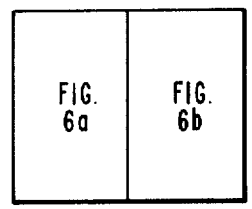

METHOD AND MEANS FOR PATH INDEPENDENT DEVICE RESERVATION AND RECONNECTION IN A MULTI-CPU AND SHARED DEVICE ACCESS SYSTEM

DESCRIPTION

1. Technical Field

This invention relates to a method and apparatus for the path independent reservation and reconnection of devices by CPU's operating in a multi-CPU and shared device access system environment. More particularly, the invention relates to control unit path finding where CPU's are connectable to devices over paths including channels, control units, and devices attached to the control units.

2. Background Art

In the prior art, as for example described in Clark et al, U.S. Pat. No. 3,725,864, "Input/Output Control," the transfer of data to and from a CPU and the accessed location of storage devices, there was employed a physical path connection involving a channel, a control unit communicating with the channel on one side in an asynchronous relationship and selected devices on the other side. The operating system of the CPU initiated the transfer by a START I/O instruction. This caused control to be relinquished to a series of channel commands (CCW's). A sequence or chain of channel commands was, in turn, sent from the CPU over the channel to the control unit for selecting and accessing the storage device as well as effectuating the data movement across the interface.

As pointed out by Clark et al, a CPU was connectable to a device only over this dedicated path for a given channel program. Disconnection and reconnection over any other path involved executing a new START I/O operation. As a result, path finding and selection at the CPU level occupied significant CPU processing time for each START I/O operation. Restated, single path connections in the prior art were deemed sufficient for single transactions.

The aforementioned Clark et al reference also describes the adaptive disconnection and reconnection of channels and devices thereby making CPU and device association path independent. This is accomplished in Clark et al through the use of a plurality of channels for scheduling and executing I/O programs. In this reference, each channel or channel control unit is capable of being logically connected to a device through a cross point switch. I/O tasks are placed in a queue common to the channels. The channels extract the tasks from the queues and execute channel programs associated with the tasks. During latent periods of device activity, the channel programs corresponding to the devices are queued in device queues. This frees the channel to go onto another task. When the device arrives at the point where the channel program can be continued, any free channel having access to the device reenters the program by extracting it from the device queue, thereby resuming execution of the program.

The prior art is also replete with references, each disclosing arrangements for sharing memory and communication facilities. Also references abound which describe the reconfiguration of multi-processing systems. Of the former, Beausoleil, U.S. Pat. No. 3,581,286 teaches the space division switching of channels to control units, while Gavril, U.S. Pat. No. 4,004,277 teaches the use of a control unit for path selection of peripheral units to CPU's by way of an "intelligent switch." This permits a second CPU to utilize some of the operating system (OS) of a first CPU in accessing backing stores when said stores are off-line. Examples of configuration control in multi-processors may be found in Sharp, U.S. Pat. No. 3,768,074; Stafford, U.S. Pat. No. 3,386,082; and Curley, U.S. Pat. No. 3,934,232.

THE INVENTION

It is accordingly an object of this invention to increase the availability of devices to CPU's by dynamically allocating path sets on the outboard side of the channel/device interfaces. In turn, the object is satisfied by a method and apparatus for the path independent reservation and reconnection of storage devices by CPU's operating in a multi-CPU and shared direct access storage subsystem environment. The method comprises the steps of forming a map of network topology and storing said map at a common control node in the network; generating and maintaining context information such as CPU and device identity and priority of connection, and storing said information at the common control node; and managing the connection of CPU's to devices such that for any given reservation or reconnection indication, the map is accessed by at least one control unit for ascertaining whether the CPU is a member of a set of interfaces to which the device has allegiance, if so, an available path is selected.

In this invention each CPU is a source node with a set of fan out paths (channels). The paths are intercepted by cooperating control nodes (control units) in order to terminate in a single destination device. Each CPU can reserve a device over one channel and be capable of subsequently starting an I/O operation to the same device over a second channel. If the first channel were busy, the operations could still be initiated immediately, rather than waiting for that channel to become available as is currently required in the prior art. It is the essence of this invention that path selection utilize a path availability map by the control unit. This permits a device to be disconnected from a channel and to be subsequently reconnected to a second channel for continuation of a chain of commands (CCW's). If a device is not required to execute an entire chain of commands over a single interface, then it will be connected to the first free path to the initiating CPU.

Device availability in the storage subsystem in respect of CPU's is increased. this arises from the fact that dissimilar path sets of devices and CPU's are allocated dynamically on an allegiance basis. This increases the signal path connection probability by devices to the counterpart CPU's involved in the selection of reserved devices, or reconnection of the device and CPU.

Lastly, the invention and the prior art recognize that channels are no longer considered as independent logical processors, as for example described in Beausoleil. Rather, they constitute a set of cooperative channels, any one of which can start a task. Also, any of the channels can resume a task provided that the above-described outboard facilities allow this networking to be executed.

BRIEF DESCRIPTION OF THE DRAWING

FIGS. 4a and 4b are matrix representations of the network relations in FIG. 3 for respective DEVICE O and DEVICE I.

FIGS. 5a through c sets forth respectively a CPU/control unit port relationship, a device busy vector, and an example of a device allegiance table.

DESCRIPTION OF THE BEST MODE AND INDUSTRIAL APPLICABILITY

Figure 1:
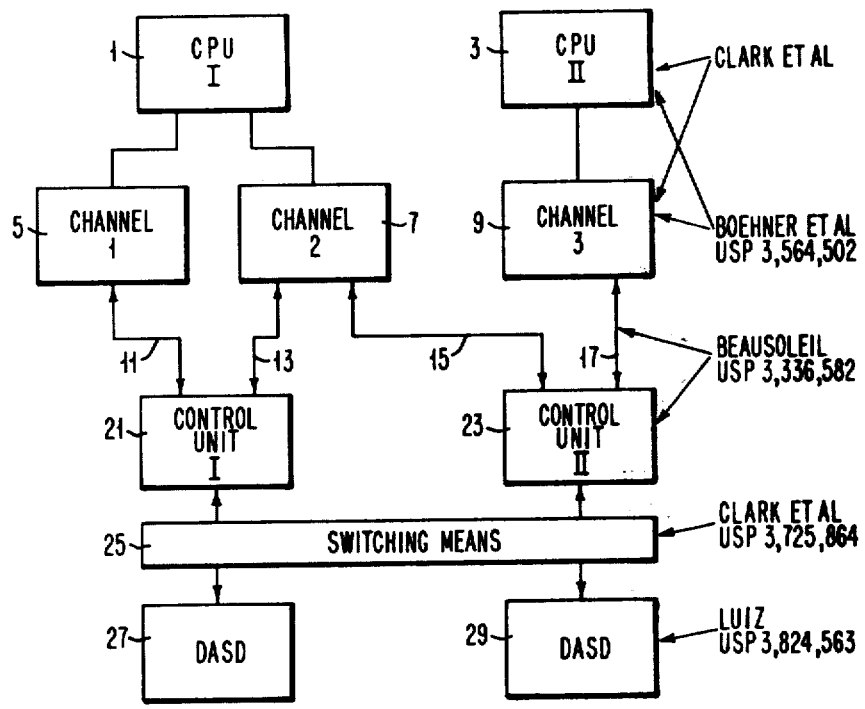
FIG. 1 depicts a pair of CPU's accessing a shared DASD subsystem according to the prior art.

Referring now to FIG. 1 there is shown a first 1 and second 3 CPU coupled to corresponding control units 21 and 23 over channels 1 and 2 (paths 11, 13) and channels 2 and 3 (paths 15, 17). The control units share access to direct access storage devices (DASD's) 27 and 29 over switching means 25. It would be helpful to consider the relations among a single task initiated at CPU 1, the dedicated path connection between CPU 1 and DASD 27 in relation to the command and data pathing according to the prior art found for example in the aforementioned Clark et al and also in Beausoleil, U.S. Pat. No. 3,336,582 and Boehner et al U.S. Pat. No. 3,564,502.

Start I/O and Transfer of Control to CCW Sequence

A CPU's relationship to a DASD begins when the CPU invokes the START I/O instruction. This instruction serves to establish a connection between the CPU and an addressed device and the execution of a channel program with the device. The invocation of the START I/O instruction causes control to be relinguished to a series of channel commands. This series or chain of channel commands (CCW's) is, in turn, sent over the channel to the control unit for selecting and accessing the device and effectuating any data movement across the interfaces. As suggested, each channel program consists of a sequential list of operations resident in the CPU main memory. The transmission to and execution at the control unit of the CCW's takes place only after initial connection between the CPU and the control unit takes place. For each operation (CCW) in the channel program, one or more counterpart operations are required either at the control unit or device level over an active connection. Of course, the list or CCW sequence may be discontinuously executed (segmented).

Active Connections for Data Transfer and Disconnected Mode for Device Control CCW's It would be desirable to review an enumeration of the active connections among the channel, control unit and devices. The first active connection is that of an initial selection sequence. This sequence is invoked with a START I/O operation in which an initial path is set up both electrically and logically in terms of device address (virtual/real) and device status (available/busy). The next active connection relates to that of CCW transfer and execution. A control CCW such as a SEEK requires physical positioning or activity at the device. A control unit, in response to receipt of a control CCW, can execute the CCW in disconnected mode. This means that the control unit disconnects from the channel while executing the indicated operation. The control unit does not require any more channel activity until it reconnects to said channel. In a typical IBM 370 System as described in the above-named references, after a control unit has received a SEEK CCW and the parameters (target address) it disconnects for 30 milliseconds or more. 30 milliseconds is an average time it takes to dispatch an accessing arm of a DASD in order to arrive at the tracks of a cylinder of interest. During this "dead time" both the channel and the control unit are free to establish other connections. In contrast to disconnected modes, CCW's involving the movement or transfer of *data* between the channel and the device, such as READ or WRITE CCW's require the control unit to remain connected to the channel in order to effectuate the data transfer.

Chained and Non-chained Ending Sequences

Each CCW must be obtained from the list in the CPU main memory and transferred over the channel to the control unit. At the control unit the CCW is executed. Subsequent to execution there occurs an ending sequence. If the CCW is of the control type requiring device positioning, the control unit disconnects from the channel and must also reconnect when the control or device positioning has been completed. It is then followed by an ending sequence. The ending sequences are of two types. These are the chained ending sequence as between CCW's in the same sequence and non-chained. The non-chained ending sequence references the last CCW in a given series.

Control Unit Operation in Disconnect Mode

Control unit operation in disconnect mode involves the control unit disconnection from the channel control unit interface for each CCW *not requiring* an active connection. The class of CCW's not requiring an active connection includes control CCW's directing mechanical movement of storage devices. Illustratively, a SEEK CCW results in the control unit disconnecting after the target DASD address is received. Responsive to counterpart commands from the control unit, the device positions the head arm assembly with respect to the address and sets a completion signal. The control unit, in turn, asynchronously polls a completion signal register and determines the channel identity for which reconnection should be requested. This identity is determined from internal tables. The control unit then solicits reconnection in respect of the channel. Parenthetically, in disconnect mode, the control unit, after dispatching device X to execute a SEEK CCW, may perform an operation with device y. The same is true of the channel. That is, the channel may be involved in another channel program.

Control unit reconnection to the channel is permissive with respect to the channel. After the channel acknowledges the reconnection request by way of a "grant request" signal, then the control unit transmits both control unit and device identification. The channel, responsive to the control unit and device ID uses said ID as a pointer which permits the channel to reorient to the channel program of interest.

A Brief Look at Dynamic Pathing in CPU Device Reconnection and Reservation

The dynamic pathing method and means permit a networking of channels belonging to the same system. Networking is utilized in initial selection of a channel program and in control unit reconnection. Initial selection is a protocol between a channel and a control unit in order to establish the electrical path and control connection to enable the "selected" control unit to process a CCW chain. As previously mentioned, since the channel programs are invoked at the CPU by the START I/O instruction, then during the invocation, it is the control unit which must perform logical qualification, i.e. "Is channel 3 allowed to use device y?" This is resolved by the control unit using the CPU identification (name, token) and tables. The question may be resolved as follows: "Is channel 3 owned by CPU II? If this is the case, then which CPU also owns device y?" With respect to control unit reconnection, it should be observed that the control unit records "ownership" (allegiance) of a device by way of the CPU ID and not the channel ID. Thus, upon a device completion signal, the control unit can identify all channels owned by CPU II based upon a table showing the CU channel/port termination and the CPU ID. It follows that a control unit requesting reconnection will cause such request to be placed upon all channels coupling the control unit simultaneously which are associated with the CPU ID and the device.

Consideration should likewise be given to the reservation of a device by a CPU. In the IBM System 370, the RESERVE CCW associated a device and a channel whereas in dynamic pathing a RESERVE CCW associates a device with a CPU name. Also, in IBM System 370, the control unit is not aware of any identity beyond the channels. Consequently each channel is treated uniquely. As an example, if channel 1 had reserved DASD 27, then channel 2 could not access the DASD. This is because control unit 1 (21) is not aware of the fact that there exists a CPU I. To restate, in dynamic pathing, if CPU I had reserved DASD 27, then the reservation would be made on a path independent basis (CPU I, DASD 27).

Figure 2:
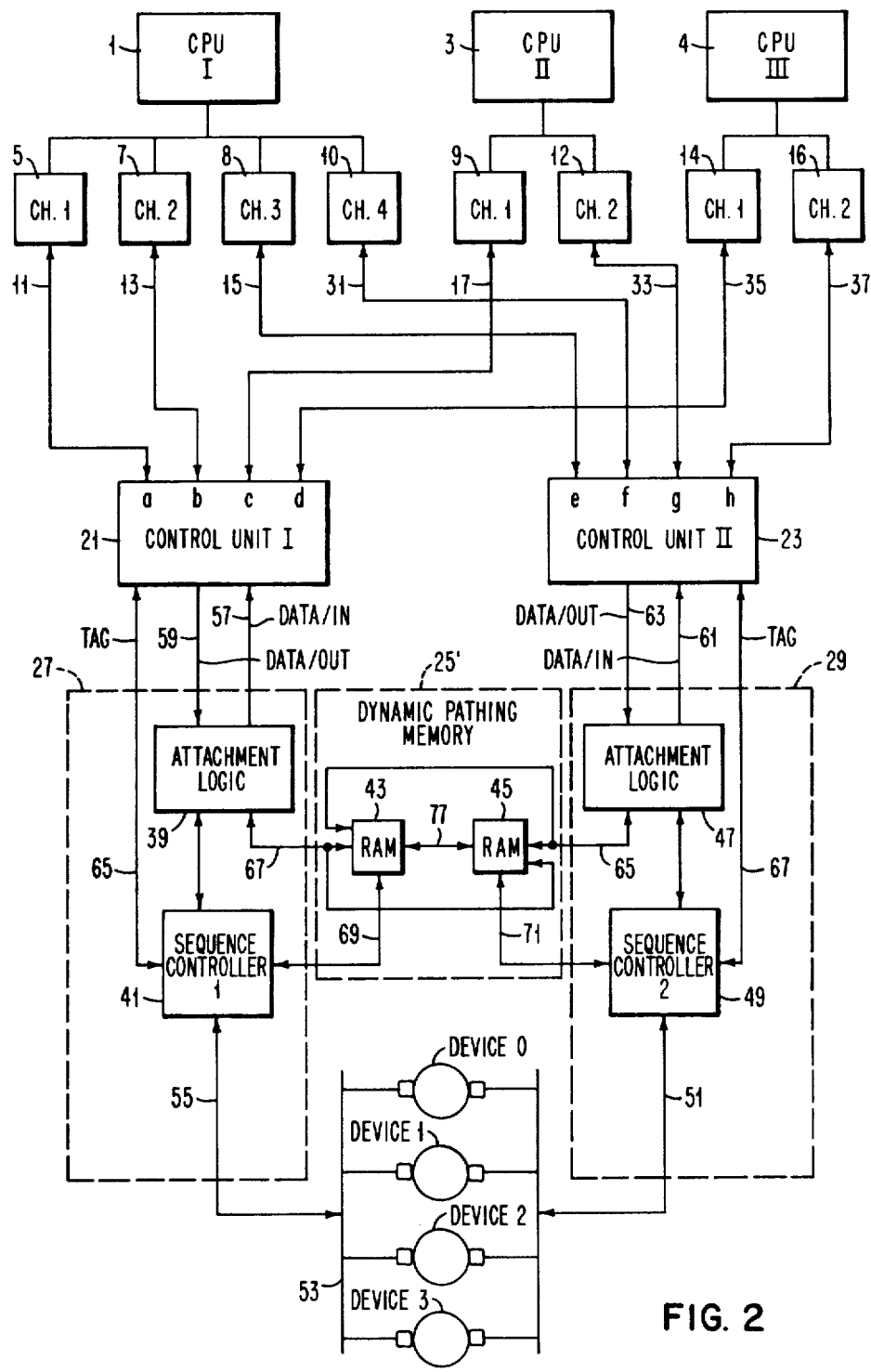
FIG. 2 shows multiple CPU's accessing a shared DASD incorporating the dynamic pathing feature of the invention.

A Typical Multi-CPU and Shared DASD Storage System Configuration Using Dynamic Pathing Referring now to FIG. 2, there is shown a multi-CPU and shared DASD configuration according to the invention. Three CPU's 1, 3, and 4 hereinafter designated by Roman numerals respectively CPU I, CPU II and CPU III, are suitably cross-connected to a pair of control units 21 and 23, hereinafter designated CU I and CU II over counterpart channels. In this regard, CPU I attaches four channels, 5, 7, 8, and 10; CPU II attaches two channels, 9, 12, and CPU III attaches two channels 14 and 16. Channels 1 and 2 of CPU I terminate in CU I ports a and b, while channels 3 and 4 of CPU I terminate in CU II ports e and f. Channel 1 of CPU II terminates in CU I port c with channel 2 of CPU II attaching CU II at port g. Lastly, channel 1 of CPU III drives port d of CU I with channel 2 of CPU III driving port H of CU II. This one-to-one channel to CU port relationship is distinguished over that shown in FIG. 1 in which channel 2 of CPU I terminated in one port in control unit 21 and another port in control unit 23.

Referring again to FIG. 2, it is seen that CU I and CU II attach devices 53 through DASD controllers 27 and 29 over a demand/response interface embracing tag and data lines. The interface between CU I and DASD controller 27 includes tag lines 65 and data/in and data/out lines 57 and 59. Likewise, tag lines 67 and data/in and data/out paths 61 and 63 couple CU II to DASD controller 29.

The demand/response type interface is one in which the tag out identifies and validates the information on the data line out and vis-a-vis. In this regard, each CPU/control unit/device operates asynchronously with respect to one another in which directional control is asserted from the top down. As suggested in the previous discussion, active connection between elements for executing operations is necessary for extended periods only in respect of the movement of data from device to channel or from channel to device. Otherwise, tasks or operations may be performed in disconnect mode.

Devices 53 are accessed either through DASD controller 27 or DASD controller 29. DASD controller 27 includes attachment logic 39 and sequence controller 41 coupling devices 53 over path 55. Similarly, DASD controller 29 includes attachment logic 47 and sequence controller 49 to operate devices 53 over path 51.

Between the DASD controllers 27 and 29, there is juxtaposed dynamic pathing memory 25'. This memory contains the map of network topology and the necessary context information utilized by the CU's in managing the connection between CPU's to devices. As such, emphasis is given to fast access. Consequently, memory 25' comprises a pair of random access memories (RAM) 43 and 45 which can be commonly accessed by either CU through the appropriate attachment logic. Thus, CU I can access for reading, writing or updating purposes RAM 43 and 45 through attachment logic 39, path 67. CU II can commonly access the RAM's over attachment logic 47 and path 65. Significantly, the operations concerned with accessing of devices 53 involving the dispatching and positioning of electromechanical elements such as the head disk arm assembly on direct access storage devices 0-4 is regulated by the commands and parameters sent from the control unit through the attachment logic and sequence controller.

The Need for Path Availability Maps and System Initialization

Figure 3:
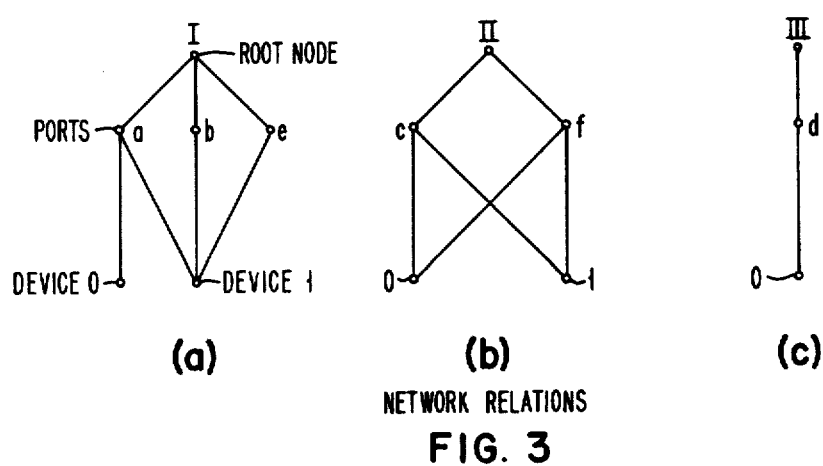
FIGS. 3a, 3b and 3c illustrate the network relations among the CPU's, control units, and devices which may be arbitrarily established during an initialization phase.

It is apparent from FIG. 2 that each CPU has a choice of channels, a choice of control units and therefore a choice of DASD controllers. Self-evidently, there are many possible paths coupling a given device say device 0 to CPU I. One path might be through controller 27, CU I and either channel 1 or channel 2. Other paths include a device controller 29, CU II, and channels 3 or 4. The first problem, then, is to construct a path availability map on the basis of CPU's defining the devices they wish to be connected to. Since the CPU's and devices are coupled to specific control units and the ports thereof, it is then possible to diagram or represent such associations by networks, maps, and/or tree structures. Examples of tree structures are shown in FIG. 3, their tabular equivalent is set forth in FIGS. 4a and b with context information tables illustrated in FIGS. 5a through c.

In addition to the network topology and context information, there is a need for systematically initializing multi-CPU and shared DASD systems into the setting up of this aspect and also of forming variance as desired. There will thus be described the characteristics of several channel command words related to the initialization of the control unit as well as status sensing of the network. Each control unit in turn will be responsible for sending commands to the associated device controllers for accessing information stored in memory 25'. Relatedly, the operational elements required to support path independent device reservation and reconnection includes multiple ported and dedicated CU's, a pool of devices, contention resolution logic with respect to accessing the shared devices, and the CU's sharing of data concerning the system topology by way of a read/-write access to a shared memory (RAM) coupled between the device controllers, the control units providing the necessary processing with respect to channel device switching.

System Initialization Using Newly Defined CCW's

Two new CCW's in addition to the complement described in Amdahl, U.S. Pat. No. 3,226,689, and in the publication "IBM System/370 Principles of Operation," Form A22-7000-4. These new CCW's are Set Host ID (SHID) and Sense ID (SNID). The SHID CCW is a declaration by an initiating CPU using a multiple byte identifier via a control unit of an alleginace (concordance) between any device and any CPU, i.e. device name and CPU name. The allegiance is formed by the CU in response to this CCW. The number of bytes should be sufficient in order to provide the code capacity to subset two or more logical systems for multi processing purposes, that is, two or more ID's for each CPU. Significantly, a CPU should execute a new SHID CCW for each CPU/device pairing of interest.

The second newly defined CCW SNID references a sense instruction used to interrogate "the network" (three structure) of a device. This is used if one CPU transfers ownership to another CPU or loses control.

In the multi byte SHID CCW the first byte is the function control byte while the remaining byte constitutes the CPU identification. Preferably, the SHID CCW should not be included in a CCW chain with any other command. The function of the CPU ID is associate the identity of device to the identity of the system selecting the device. Any ID may be assigned by the CPU except the ID of zero. Since preferably only one ID is assigned to a CPU at any one time, it is not necessary for a CU to store a CPU ID for each device for each interface. Consequently, only one CPU ID need be maintained by a CU for each interface regardless of the number of devices attached to the control unit. The first SHID CCW addressed to any device on the CU that is accepted by the CU will cause that ID value to be assigned to the interface over which it is received. This ID value can only be changed by a system reset. Any subsequent SHID command on this path addressed to that same device or any other device attached to the CU must specify an identical ID value or the CCW should be rejected.

The SHID command should preferably include a function control byte which defines the subsequent use to be made of the parameters within the SHID command. Among the functions of interest is that of the establishment of a group. In this regard, a group means the association of a CPU ID with specific device ID's. Other functions of interest may be those of disbanding the group and resigning from the group.

Networks, Maps, and Tree Structures

The SHID CCW is merely the mechanism by which the control unit will formulate a network map. Several constructs illustrated in FIGS. 3 through 5 can be used to better appreciate the network topology (path availability) map and context information. The following remarks relate to an example of map formation and the participation of the system elements in the creation and maintenance of said maps.

Suppose CPU I intends to attach device 0 through CU I port "a". Furthermore, suppose CPU I intends to attach device 1 through CU I port "a", and "b", and CU II port "e". Similarly, CPU II intends to connect to devices 0 and 1 through CU I port "c" and CU II port "f". Lastly, CPU III intends to be coupled to device 0 through CU I port "d". A graphical depiction of these network relations is shown respectively in FIG. 3a–c.

Systematically, CPU I will execute SHID CCW for each port and device reservation. As an example, a first SHID will be sent for the coupling of port "a" and device 0. Another SHID for port a and device 1. Still another for port "b" and device 1 and yet another for port "e" and device 1. Significantly, both control units will access this allegiance map in order to supplement it. Also, an independent tree structure will be kept for every device. After the system initialization function, i.e. after the tables are built, CPU's will initiate a CCW sequence with a START I/O operation. Typically this is begun with a SEEK CCW. This CCW causes a disconnect between the control unit and a channel at the time that the associated DASD access arm is dispatched. CU I receives the SEEK instruction for say device 1 at port "a". It must make a table entry identifying the allegiance of the device addressed in the SEEK CCW. The CU disconnects from the channel such that both the CU and the channel can switch operations. At a time subsequent, device 1 posts an operation completion signal. CU I asynchronously polls the device status. CU I identifies the CPU ID for device 1 from an allegiance table. From the "tree map"0 the CU can identify the ports and channels coupling the CPU.

Significantly, as seen in FIG. 2, both CU I and CU II have instantaneous parallel access to device status/completion data. As may be seen from the tree in FIG. 3a, if device 1 had completed and operation and was now available for another, the status could be polled by either or both CU's with a reconnection request being placed respectively at ports "a" and "b" of CU I and port "e" of CU II.

Reservation of Devices by CPU's

Device reservation by a CPU is a form of lock in which access to a device by a CPU other than the reserving CPU is prohibited. In System 370 allegiance of a reserved device is to the channel over which the reservation was transmitted.

In this invention when a CCW chain is completed in the absence of a RESERVE CCW, then the ownership (CPU) ID is removed from the allegiance table. Illustratively, a device j has allegiance to CPU I as indicated by a tag in the allegiance table during the entire time that the CU is executing a CCW chain for CPU I or for the entire time that RESERVE CCW has been issued against the device and a RELEASE has not been forthcoming. It should be noted that a RELEASE negates a RESERVE. In this sense, the term "path independent reservation" connotes that devices are tagged by CPU ID and not the physical port (channel). This permits a CPU to use any of the possible paths in order to reuse the device.

Construction of Tables

This invention dynamically allocates dissimilar path sets to devices by CPU's on an allegiance basis in order to increase the signal path connection probability by devices to counterpart CPU's involved in the reservation, release, or reconnection of the devices to the CPU's. The residence of the structures necessary for dynamic allocation resides in the common storage, i.e. memory 25' located between DASD controllers 27 and 29. In the following exercise there will be described the construction of tables shown in FIGS. 4 and 5 corresponding to networks 3a–c.

The first construct is the CPU ID list shown in FIG. 5a. This is a linked linear list whose capacity is set equal to the number of ports possessed by the control units. This list shows the correspondence between all root and second level nodes depicted in FIG. 3, that is, it shows the correspondence between the CPU identity and the ports. Thus CPU I terminates in port "a" with a link indication to port "b". The entry counterpart to port "b" for CPU I shows a link to port "e". The entry for port "e" shows a link back to port "a". Similarly, CPU II is entered for ports "c" and "f" with links respectively of "f" and "c". Lastly, CPU III is the sole entry with respect to port "d".

The next construct are those of the device group table—CPU ID table in FIGS. 4a and b. Since any one port can have only one name, then for 8 ports (a, b, c--, h), there can exist only up to 8 distinct names (CPU ID's). However, each one of say 8 devices can have allegiance of up to 8 ports for a total of 8×8 or 64 ordered pairs, i.e. (device, port). Every horizontal row in each device group table establishes the second level nodes in the corresponding tree structure for that device. For example, from the network relations in FIG. 3b, device 0 can be accessed over nodes c or f. Accordingly, in row c, a "1" appears in the "c" and "f" positions. In contrast, row "a" in FIG. 4a, shows a "1" entry only for port "a". This corresponds to device 0 being accessed by CPU 1 only through port "a" as shown in FIG. 3a.

Referring now to FIG. 5b, there is shown a typical busy vector. The busy vector indicates device usage status. The devices are respectively represented by counterpart vector bit positions 0 through 3. A "0" in the vector bit position represents a device not busy while a "1" represents device busy. Clearly, a device interface is available if the device is idle.

The device allegiance table shown in FIG. 5c correlates the status of the CU ports "a" through "h" with those of the devices 0 through 3. The allegiance or availability of the device and port interfaces is dynamically changing and reflects all ports on whose behalf a busy device remains occupied. It is believed that both the construction and use of the device allegiance table and the other constructs can be best appreciated by way of an illustrative example.

Suppose CPU II requested connection to device 0. If the request was received by CU I, it would scan the device allegiance table shown in FIG. 5c at the row corresponding to device 0 and identify a "1" in port positions "c" and "f". Since port "f" does not terminate in CU I, the CU would only notice that port "c" would be allowed to use device 0. CPU II would send a SEEK CCW over the path terminating in port "c". In turn, CU I would send commands to device 0 dispatching its associated arm. At a time prior to disconnecting from the channel, CU I would update the appropriate table in order to properly reconnect when the SEEK CCW is completed by device 0. This updating consists of copying the entire contents of row c from the device 0 group table shown, for example in FIG. 4a into the device availability table for device 0. The CU also turns the busy vector bit on for device 0 as in FIG. 5b. At this time the CU then disconnects from the channel. When the device 0 arm comes to rest, it sets a completion status bit (not shown).

The status of devices attached to the control unit is polled at the instance of the CU. Thus, if CU I were considered busy, then CU II could poll the devices and recognize device 0's completion status. The CU II would scan the device availability table and become cognizant that device 0 is coupled to ports "c" and "f". CU II then places a request for service signal upon port "f".

Reconnection Sequence in Detail

The question arises as to what happens while CU I and device 0 are in disconnect mode when another CPU requests status or connection. It is sufficient for purposes of this invention to note that either CU in a duplex CU arrangement can recognize a device completion signal, and determine from a common table that the completion signal should be mapped into a continuation signal or request for continuation with respect to the channels. Furthermore, it should be noted that the CU ascertains from a device or CU port allegiance table the identity of the physical channels manifest by their unique port ID's. In response to the request to reconnect, the channel does not know the identity of the CPU and hence does not know which CCW list is to be reinvoked. Consequently, the channel sends a grant signal (SELECT OUT). The CU responsive to the grant signal replies with the device ID (name) as a pointer into the main memory table of CCW lists, which pairs the device ID and the CCW list of interest. After this the channel resumes execution of the CCW string.

This may be summarized as follows: In order to reconnect a device to a CPU, it is necessary to 1. Have a control unit initiate polling of device completion signals.
2. Have the control unit raise REQUEST IN on those channels associated with the device as determined from the device allegiance table.
3. Each associated channel responsive to a REQUEST IN may generate a grant signal (SELECT OUT). Multiple occurring grant signals are resolved, if *concurrent*, then, the channel having the highest priority is attached. Otherwise, the channels are attached on a first come, first served basis.
4. Have the CU transmit reconnection requesting device ID to the associated channel.
5. Have the channel utilize the device ID as a pointer to the CCW list to be resumed.
6. Arbitrate which CU will have access to a device where a single device completion signal raises multiple grant signals from multiple CU's raising multiple requests in, and both CU's having trapped a channel each on behalf of the same device completion signal.

Dynamic Pathing Memory, Accessing and Controls

Figure 6A:
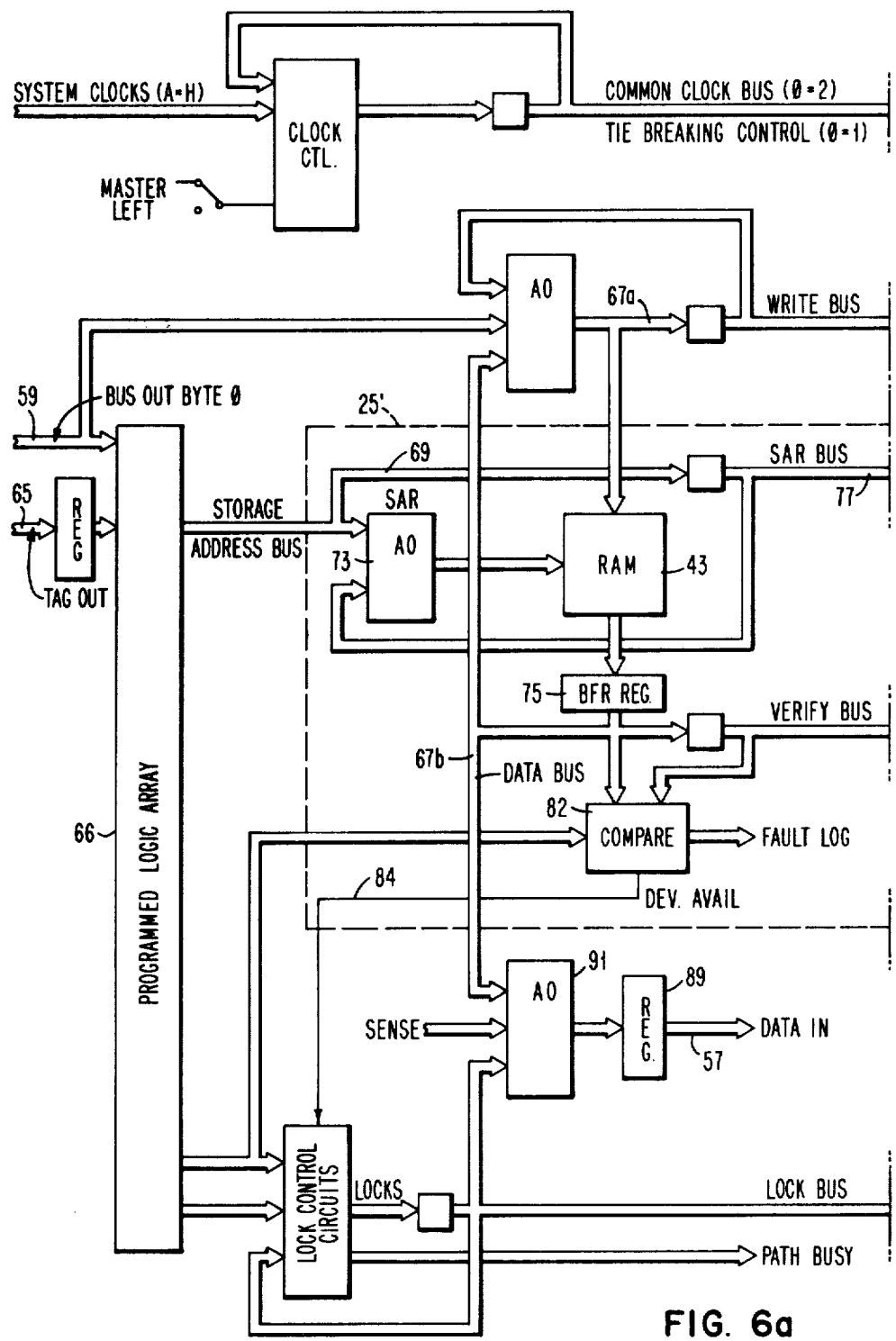
FIGS. 6a and 6b show a second level logic implementation of the dynamic pathing memory 25' of the embodiment set forth in FIG. 2.
Figure 6B:
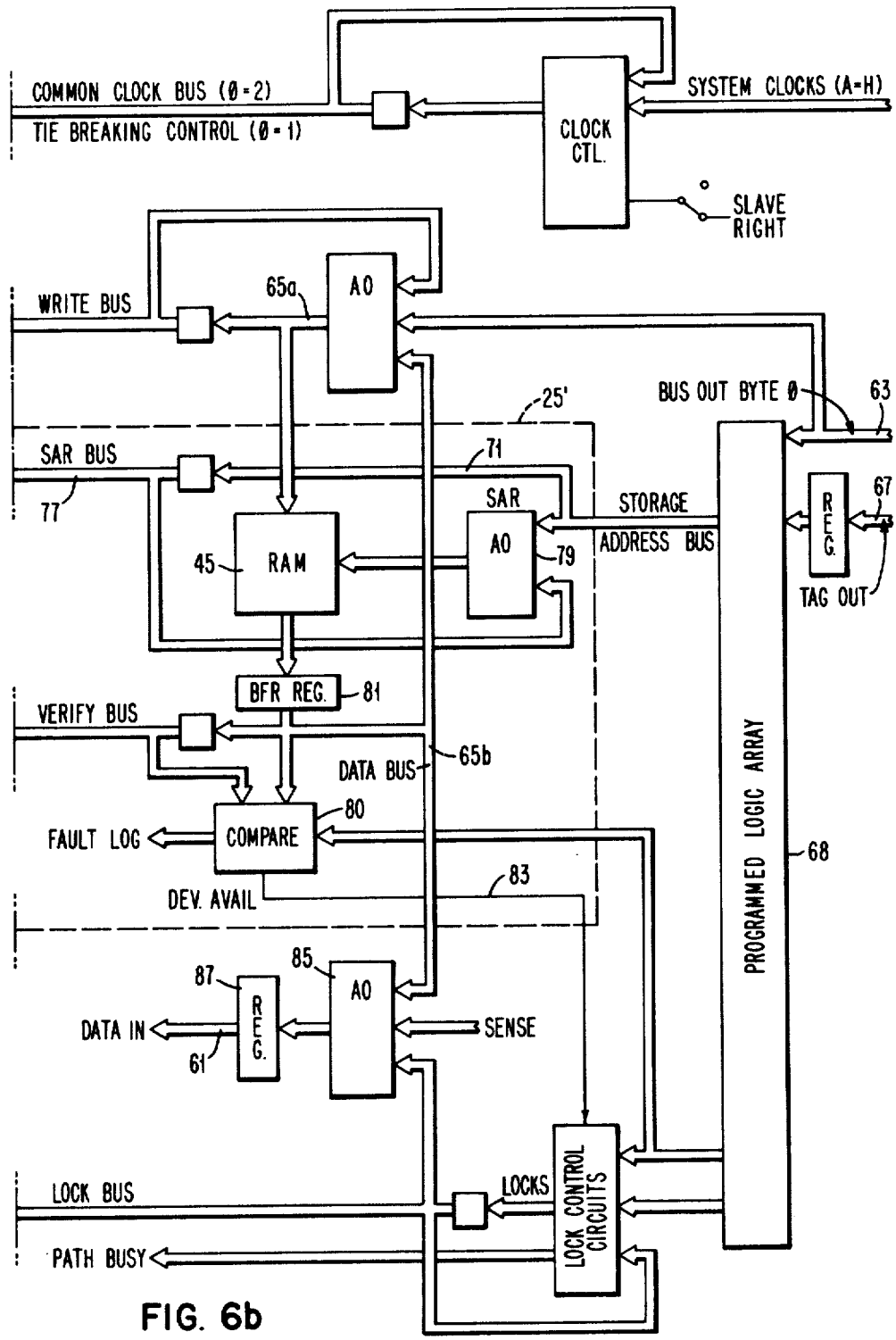

Referring now to FIG. 6 when taken together with FIG. 2, DASD controllers 27 and 29 access a plurality of DASD's 53 over respective paths 55 and 51. Each control unit 21, 23 may comprise, for example, the IBM 3830 File Control Unit and the DASD's or disk drives 53 may comprise, for example, the IBM 3330 disk drive.

Each of the device controllers 27 and 29 includes a tag bus 65 and 67, respecitvely for sending commands to the disk drive and a "tag gate" (not shown) to operate a gate circuit for the tag bus in each of the disk drives 53. A data bus out 57 and 63 supplies additional command information and also provides the disk drive module number to select a specific drive, i.e. device 0 through device 3. Although the detailed control and data pathing relationships between a control unit, device controller and disk drive are not properly the subject of this invention, and while reference for such detailed understanding can be made to Luiz, U.S. Pat. No. 3,824,563, issued July 16, 1974, explanation of selected aspects will aid in the understanding and appreciation of the novel method and means of this invention.

Tag bus lines 65 and 67 terminate in respective programmed logic arrays 66 and 68 through incidental buffer registers. The programmed logic arrays operate as a tag decode circuit such that a predetermined number of binary bits on the tag bus are decoded and used to actuate a number of control lines. In any disk file the address of a particular track is designated by a combination of the cylinder address and head address. The control unit requests the target address by activating the appropriate tag and bus outlines. The control unit is arranged to cause the SEEK operation from one cylinder to another by commanding the access mechanism (not shown) to move forward or backward a specified number of cylinders. The details of the commands and information necessary to dispatch and position an access arm in a selected drive to the point where the transfer of data to and from disk tracks can be executed is amply supplied in the Luiz reference.

In addition to transmitting both commands and parameters for accessing information from devices, the device controllers 27 and 29 also serve to access information from dynamic pathing memory 25'. In this regard, the dynamic pathing memory 25' comprises a pair of random access memories (RAM's) 43 and 45. Each RAM is serviced by an output buffer register 75 and 81. It will be noted, that storage address bus 69 and 71 is cross connected through appropriate switching and combination logic 73 and 79 as are the write paths 59, 67a; 63, 65a and read paths 67b, 91, 89, and 57; and 65b, 85, 87, and 61. Shown also are lock control circuits for inhibiting access by one device controller or the other based upon the device availability signals 83 or 84.

The programmed logic array 66 and 68, provides the controls in order to maintain device and path status, software locks and device channel allegiance information for use by the respective CU's. Tie breaking in case of simultaneous access is done under control of the system clocks and tie breaking control elements 93, 95, 97.

Broadly, the RAM's are accessed at an address placed on storage address bus 69, 71, and cross compared over path 77 through combinational logics 73 and 79. The memory address being supplied over the bus/-outs 59 or 63 with the appropriate tag/out signals on line 65 or 67. If memories 43 and 45 are read, the contents of the address specified on the storage address bus are copied into buffer registers 75 or 81 and shipped over the data bus through paths 67b, combinational logic 91, and register 89 into the data/in paths 67 or 61. For data to be written into the RAM's the data is sent over bus/out 59 or 63 through combinational logics onto the write bus paths 67a or 65a.

Unit selection and deselection involves initialization of each of the RAM's, initialization being the placement of the aforementioned tables in the RAM's to permit subsequent selection, reconnection, and reservation. Initial selection is achieved by a CU placing the device controller and device address on the data bus out 59 or 63 and sending a select out signal on the tag bus 65 or 67. After the target DASD (device) controller verifies the selection address, the entire address on data bus out is stored for later use in the selection sequence. At this point the selection process continues in the manner well known to the art in which an appropriate busy bit will be entered into the busy vector and the usual software and hardware locks activated.

The invention involves modifying the command set sent from the CU to the device controller only to the extent that it is necessary to access dynamic pathing memory 25', read and/or modify the memory contents. Consequently, each CU will send a command causing data to be read from the RAM associated with the CU such that CU 1 will cause data to be read from RAM 43, while CU 2 will cause data to be read from RAM 45. Such a read command should cause data read from the first RAM to be simultaneously compared with data accessed at the same address from the second RAM and to be transferred over the appropriate data in path. The starting address may be specified by a predetermined number of sequential bytes transferred to the device controller on the bus out following the command sent on the tag out path. The length of the data transfer is under the complete control of the initiating CU.

A write type command should cause data to be transferred from the initiating CU and written into both RAM's 43 and 45. Again the starting address may be specified by a predetermined number of sequential bytes transferred to the device controller on the data path out following the command sent on the tag out path. The length of the data transfer is also controlled by the initiating CU.

Naturally, in order to reserve devices, it is necessary to have a command that would cause a lock to be set. Accordingly, an initiating CU should send a command furnishing a software lock function to inhibit inappropriate accessing of RAM's 43 and 45. Other commands would include the resetting of the locks, sensing of status and copying the content of one RAM into another.

Conclusions

The invention has been described in the context of multi CPU's sharing a DASD storage subsystem conforming to asynchronous, demand/response channel, control unit, and device architectures. The devices attaching the control units need not be limited to DASD or even to other memory or storage devices. Indeed, any input/output device including start/stop devices may be used. In this invention, the use of the CPU for path finding allows each device interfacing the CU to be reserved to a CPU rather than to a single path. In this invention, a CPU can reserve a device over one channel and be capable of subsequently starting an I/O operation to the same device over a second channel. It is the essence of this invention that path selection utilize a path availability map by the control unit. This permits each device to disconnect from a channel and subsequently reconnect to a second channel for continuation of a chain of commands. If the device is not required to execute an entire chain of commands over a single interface, it may instead choose the first free path to the initiating CPU for reconnection purposes. The network topology and associated information is in the preferred embodiment stored in random accessible memory suspended between a pair of DASD controllers. It could also have been multi-pathed between each CU as well as been recorded on the tracks of a DASD device. Significantly, the map should be available at a common control node in the network.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. In a system comprising at least a first and second CPU; shared input/output devices; at least a first and second set of fan-out paths (channels), each path set coupling a corresponding CPU as a source node; and at least a first and second control node, each control node including means for accessing the devices and for selectively intercepting predetermined paths from either set in order to complete a signal path connection to a single destination device;
characterized in that
the system further includes:
means for dynamically allocating dissimilar path sets to devices and CPU's on an allegiance basis for increasing the signal path connection probability by devices in respect of their counterpart CPU's involved in the selection of reserved devices, or reconnection of a device to a counterpart CPU, said allegiance constituting an a priori association among a given CPU and at least one device for the purpose of processing reservations and access requests to the exclusion of other CPU's;
said dynamic path allocation means includes at each control node:
memory means for storing a map defining signal path availability among the system elements;
means for ascertaining device availability;
means responsive to device availability status for initiating a reconnection request;
means for accessing the memory means and for ascertaining path availability responsive either to a CPU-originated signal for device connection over an intercepted fan-out path or an available device reconnection request; and
means for broadcasting any reconnection request over available paths between the control node and the CPU having the requisite device allegiance.

2. In a system comprising at least a first and second CPU; shared input/output devices; at least a first and second set of fan-out paths (channels), each path set coupling a corresponding CPU as a source node; and at least a first and second control node, each control node including means for accessing the devices and for selectively intercepting predetermined paths from either set for completing a signal path connection to a single destination device; each CPU, path, control node and device having at least one interface operable as a boundary sharable with a connecting system element for the transfer of information;
characterized in that
each control node includes:
memory means for storing a map of the CPU, node, and path connections;
means for modifying the map responsive to allegiance information from at least one CPU (SHID, SNID) communicated to the control node over an intercepted path and for generating and maintaining CPU and device identity and priority of connection information; and
means for completing the signal path connection for any given reservation or reconnection indication respectively from an originating CPU or available device by accessing the map for ascertaining whether the CPU is a member of a set of interfaces to which the device is reserved and then selecting a path, if available.

3. A method for path independent reservation and reconnection of input/output devices by CPU's operating in a multi-CPU and shared device access system, the system including multiple control units, each control unit further including multiple channel/control unit interfaces and control unit/device interfaces, each channel/control unit interface communicating with one CPU while each control unit/device interface communicates with a selected one of the devices, the operating system of each CPU being capable of initiating communications with a device by a START I/O instruction, the execution of this instruction thereby causing control to be relinquished to a series of channel command words (CCW's), said series of channel command words, in turn, being sent to the control unit over the channel/control unit interface for selecting and accessing the device, said multi-CPU's, channels, control units, and devices forming a control and data pathing network, a CPU reserving a device or a device indicating availability for reconnection by respectively communicating a signal over the appropriate interfaces to the intercepting control unit;
characterized in that
the method comprises the steps of:
forming a map of network topology (FIG. 3) and storing said map at a control unit (FIG. 2, Element 25') in the network common to at least a pair of CPU's connectable over requisite channel/control unit interfaces;
generating and maintaining CPU and device identity and priority of connection information (FIGS. 4 and 5);
managing the connection of CPU's to devices such that for any given reservation or reconnection indication, the map is accessed by at least one control unit for ascertaining the path set to which connection or reconnection is possible; and
selecting an available path if the CPU is a member of the set of interfaces to which the device is reserved.

4. A method of path independent reservation and reconnection of shared access devices by CPU's for use in a system of the type comprising at least a first and second CPU; a first and second plurality of channels, each plurality of channels coupling a corresponding CPU; a plurality of input/output devices; and first and second control units terminating at least one channel, each CPU channel, device, and control unit having at least one interface operable as a boundary sharable with a connecting system element for the transfer of information; said control unit including means for accessing the devices and for switchably interconnecting channel and device interfaces; said method comprising the steps of:

forming a map of CPU, control unit, and device connectability, and storing said map at a control unit common to at least a pair of CPU's and connectable over requisite channels;

selecting a device by an initiating CPU in which the control unit completes a signal path connection to the destination device by switchably interconnecting channel and device interfaces;

disconnecting the channel from the control unit responsive to device access requests from the CPU and recording the device address and CPU allegiance of the accessed device by the control unit, allegiance constituting an a priori association among a given CPU and at least one device to process reservations and accesses to the exclusion of all other CPU's;

causing the destination device to access information as requested by the initiating CPU in a disconnected mode from the control unit and the posting of a completion signal upon satisfaction of the access request;

polling of device status by either one or both of the control units; and raising a reconnection request on those channels terminating in the respective control units which are associated with the device as determined from the previously recorded device address and CPU allegiance.

5. The method according to claim 4 in which the operating system of each CPU initiates communications with a device with a START I/O instruction, the execution of the instruction causing control to be relinquished to a series of channel command words, said channel command words are, in turn, sent to the control unit over the channel/control unit interface for selecting and accessing the device;

responsive to the reconnection request from the control unit the CPU sends a grant signal invoking the control unit and device address in reply; and utilizing the device address and control unit identity as a pointer to a predetermined channel command word sequence.

6. In a system comprising at least one CPU partitionable into two logical processors; a first and second channel coupling the CPU; a plurality of input/output devices; a first and second control unit terminating the channels, each control unit including means for accessing the devices and for switchably interconnecting device and channel interfaces, each CPU, channel, device, and control unit having at least one interface operable as a boundary sharable with a connecting system element for the transfer of information, wherein the method for path independent reservation and reconnection of shared access devices by the logical processors comprises the steps of:

forming a map of logical processor, control unit, and device connectability and storing said map for access by each control unit;

selecting a device by an initiating logical processor in which an available control unit completes a signal path connection to the destination device by switchably interconnecting channel and device interfaces;

disconnecting the channel from the control unit responsive to device access requests from the logical processor and recording the device identity and logical processor allegiance of the accessed device by the control unit, said allegiance constituting an a priori association among a given CPU and at least one device for processing reservations and accesses to the exclusion of all other CPU's;

causing the destination device to access information as requested by the initiating logical processor in a disconnected mode from the control unit and the posting of a completion signal upon satisfaction of the access request;

polling of device status by either one or both of the control units; and raising a reconnection request on those channels terminating the respective control units which are associated with the device as determined from the previously recorded device identity and logical processor allegiance.

7. In a system according to any one of the claims 1, 2, 4, or 6, wherein the device comprises a direct access storage device.

* * * * *